United States Patent
Lentczner et al.

(10) Patent No.: US 10,122,629 B2
(45) Date of Patent: *Nov. 6, 2018

(54) SYSTEMS AND METHODS FOR EXTERNALIZING NETWORK FUNCTIONS VIA PACKET TRUNKING

(71) Applicant: Google LLC, Mountain View, CA (US)

(72) Inventors: Mark Lentczner, Mountain View, CA (US); Joseph James Joshua Bailey, Lower Hutt (NZ); Zhiwei Cen, San Jose, CA (US); James Michael Bennett, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,523

(22) Filed: Mar. 15, 2018

(65) Prior Publication Data
US 2018/0205651 A1 Jul. 19, 2018

Related U.S. Application Data

(63) Continuation of application No. 14/835,109, filed on Aug. 25, 2015, now Pat. No. 9,948,556.

(51) Int. Cl.
*H04L 12/46* (2006.01)
*H04L 12/741* (2013.01)
*H04L 29/12* (2006.01)

(52) U.S. Cl.
CPC ............ *H04L 45/74* (2013.01); *H04L 12/46* (2013.01); *H04L 12/4625* (2013.01); *H04L 61/2592* (2013.01)

(58) Field of Classification Search
CPC ..... H04L 12/46; H04L 12/4625; H04L 45/74; H04L 61/2592

(Continued)

(56) References Cited

U.S. PATENT DOCUMENTS

9,667,538 B2 * 5/2017 Hammam ........... H04L 12/4641
2008/0219184 A1 * 9/2008 Fowler ................ H04L 43/0811
370/254

(Continued)

FOREIGN PATENT DOCUMENTS

CN 104283806 A 1/2015
TW 201429173 A 7/2014
WO 2015031512 B1 3/2015

OTHER PUBLICATIONS

Battula, Laxmana Rao. "Network Security Function Virtualization(NSFV) towards Cloud computing with NFV Over Openflow infrastructure: Challenges and Novel approaches," ICACCI, 2014 International Conference on Advances in Computing, Communications and Informatics, pp. 1622-1628, Sep. 24-27, 2014.

(Continued)

*Primary Examiner* — Asad M Nawaz
*Assistant Examiner* — Berhanu D Belete
(74) *Attorney, Agent, or Firm* — McDermott Will & Emery LLP

(57) ABSTRACT

The methods and systems described herein provide a mechanism to externalize network functions through a direct link between a network switch and an external packet processor. The network switch is configured to receive a packet directed to a destination node via a first network interface. The network switch is also configured to forward the received packet to a packet processor, via a second network interface, over a direct physical link between the network switch and the packet processor. The packet is forwarded with an identifier for a virtualized network function executing on the packet processor and a destination MAC address of the packet is different from a MAC address of the packet processor.

20 Claims, 10 Drawing Sheets

(58) Field of Classification Search
USPC .......................................................... 370/392
See application file for complete search history.

(56) References Cited

U.S. PATENT DOCUMENTS

| | | | | | |
|---|---|---|---|---|---|
| 2008/0253398 | A1* | 10/2008 | Calvignac | ............. | H04L 49/602 370/474 |
| 2010/0165985 | A1* | 7/2010 | Sharma | ................... | H04L 47/10 370/389 |
| 2011/0090911 | A1* | 4/2011 | Hao | ................... | H04L 12/4633 370/395.53 |
| 2012/0163164 | A1* | 6/2012 | Terry | ...................... | H04L 45/24 370/221 |
| 2014/0056298 | A1* | 2/2014 | Vobbilisetty | ............ | H04L 12/46 370/355 |
| 2014/0086177 | A1* | 3/2014 | Adjakple | ............. | H04W 12/08 370/329 |
| 2014/0317261 | A1* | 10/2014 | Shatzkamer | ............ | G06F 9/455 709/223 |
| 2014/0376555 | A1* | 12/2014 | Choi, II | .................. | H04L 45/66 370/395.53 |
| 2015/0009995 | A1* | 1/2015 | Gross, IV | ............... | H04L 45/74 370/392 |
| 2015/0036540 | A1* | 2/2015 | Kasslin | ................. | H04W 48/18 370/254 |
| 2015/0081840 | A1* | 3/2015 | Patil | ........................ | H04L 67/28 709/217 |
| 2015/0098388 | A1* | 4/2015 | Fang | .................... | H04W 48/16 370/328 |
| 2015/0124826 | A1* | 5/2015 | Edsall | ................. | H04L 12/4633 370/392 |
| 2015/0244617 | A1* | 8/2015 | Nakil | ................... | G06F 9/45558 709/224 |
| 2015/0319675 | A1* | 11/2015 | Park | ....................... | H04W 48/16 370/338 |
| 2016/0028625 | A1* | 1/2016 | Hari | ........................ | H04L 45/74 370/392 |
| 2016/0128113 | A1* | 5/2016 | Qi | .......................... | H04W 8/005 370/329 |
| 2016/0157193 | A1* | 6/2016 | Qi | .......................... | H04W 56/00 370/350 |
| 2016/0226755 | A1* | 8/2016 | Hammam | ........... | H04L 12/4641 |
| 2017/0034769 | A1* | 2/2017 | Kim | ....................... | H04W 48/08 |
| 2017/0208030 | A1* | 7/2017 | Qi | ........................ | H04L 45/7453 |

OTHER PUBLICATIONS

Github, Inc., Retrieved from URL: https://github.com/rsanger/routeflow-fastpath/blob/master/rffastpath.py on Aug. 25, 2015 (6 pages), 2015.

Jain, Raj, et al. "Network Virtualization and Software Defined Networking for Cloud Computing: A Survey," IEEE Communications Magazine, vol. 51, No. 11, pp. 24-31, Nov. 2013.

Office Action dated Nov. 7, 2017 in Taiwanese Patent Application No. 105126402, and English translation thereof.

Extended European Search Report dated Nov. 17, 2016 in European Patent Application No. 16183534.3.

Office Action dated Feb. 24, 2017 in U.S. Appl. No. 14/835,109.

Office Action dated Jun. 16, 2017 in U.S. Appl. No. 14/835,109.

Notice of Allowance dated Oct. 5, 2017 in U.S. Appl. No. 14/835,109.

Notice of Allowance dated Feb. 22, 2018 in U.S. Appl. No. 14/835,109.

Office Action dated Jul. 5, 2018 in Taiwanese Patent Application No. 105126402, and English translation thereof.

* cited by examiner

TCP/IPv6

TCP/IPv6

SYSTEMS AND METHODS FOR EXTERNALIZING NETWORK FUNCTIONS VIA PACKET TRUNKING

RELATED APPLICATIONS

The present application is a continuation of, and claims the benefit of and priority to, U.S. patent application Ser. No. 14/835,109, titled "SYSTEMS AND METHODS FOR EXTERNALIZING NETWORK FUNCTIONS VIA PACKET TRUNKING," and filed on Aug. 25, 2015, the entire contents of which are hereby incorporated by reference.

BACKGROUND

A communication network typically includes a plurality of network devices, such as routers, switches, network address translation boxes, firewalls, load balancers, etc. Network-function virtualization (NFV) is a network architecture that virtualizes network node functions into building blocks that may be connected, or chained, to create communication services.

SUMMARY

One aspect of the disclosure relates to a network system for externalizing network functions, including a network switch and a packet processor. The network switch is configured to receive a packet directed to a destination node other than the network switch via a first network interface. The network switch is also configured to forward the received packet to a packet processor for processing, via a second network interface, over a direct physical link between the network switch and the packet processor. The packet is forwarded with an identifier for a virtualized network function executing on the packet processor, and a destination MAC address of the packet is different from a MAC address of the packet processor. The network switch is further configured to receive from the packet processor the processed packet and forward the processed packet over a third network interface towards the destination node. The packet processor is configured to receive the packet from the network switch. The packet processor is also configured to route the received packet to a virtualized network function module based on the identifier included with the packet for processing. The packet processor is further configured to send the processed packet back to the network switch.

Another aspect of the disclosure relates to a network switch. The network switch includes a processor and tangible computer readable media storing computer executable instructions. When executed by the processor, the computer executable instructions cause the processor to receive a packet directed to a destination node other than the network switch via a first network interface. The computer executable instructions further cause the processor to modify a field within the header of the packet to include an identifier for a virtualized network function executing on the packet processor and to forward the received packet with the modified header to a packet processor, via a second network interface, over a direct physical link between the network switch and the packet processor. The network switch forwards the packet to the packet processor with a destination MAC address that is different from a MAC address of the packet processor. The computer executable instructions further cause the processor to receive from the packet processor the packet after it has been processed by the identified virtualized network function and to forward the processed packet over a third network interface towards the destination node.

Still another aspect of the disclosure relates to a packet processor. The packet processor includes a processor and tangible computer readable media storing computer executable instructions. The computer executable instructions, when executed by the processor cause the processor to receive a packet from a network switch, over a direct physical link between the network switch and the packet processor. The received packet includes an identifier for a virtualized network function executing on the packet processor to be carried out on the packet, and a destination MAC address of the received packet is different from a MAC address of the packet processor. The computer executable instructions further cause the processor to route the received packet to a network function module based on the identifier, process the packet using the network function module, and send the processed packet back to the network switch over the direct physical link.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

For purposes of clarity, not every component may be labeled in every figure. The drawings are not intended to be drawn to scale. Like reference numbers and designations in the various figures indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

The systems and methods described herein provide a mechanism to externalize network functions. A direct link is established between a network switch and a packet processor. In some implementations, packets to and from the network switch and the packet processor include identifiers that identify network functions to be processed by the packet processor or network functions that have been processed by the packet processor.

Figure 1:
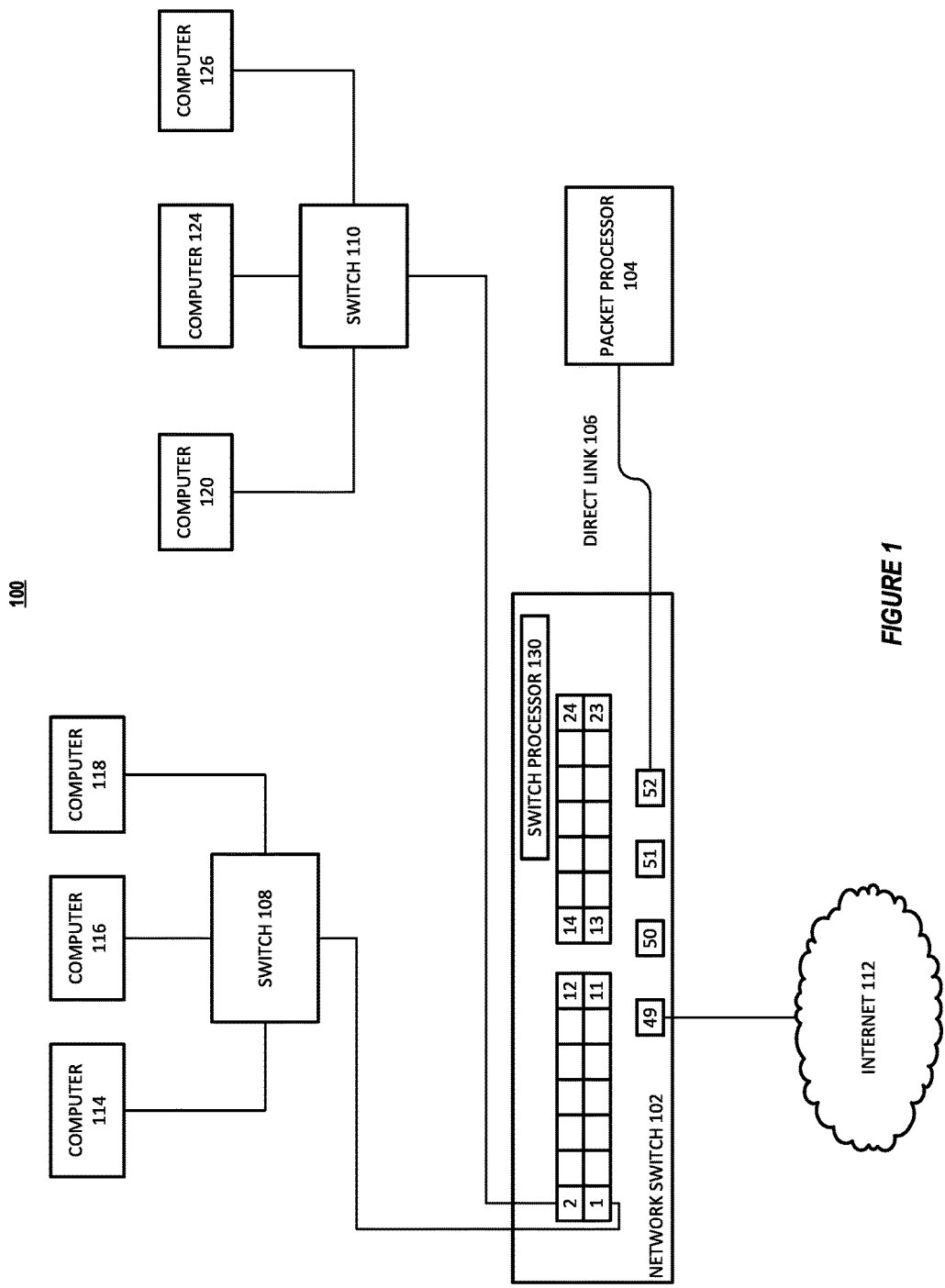
FIG. 1 is a schematic diagram of a network system.

FIG. 1 is a schematic diagram of a network system 100. The network system 100 for externalizing network functions includes a network switch 102 and a packet processor 104 that is directly connected to the network switch 102 via a direct link 106. The direct link 106 can be, for example, a direct Ethernet or fiber optic cable.

In some implementations, the network switch 102 is a multiport network bridge that uses hardware addresses to process and forward data at the data link layer (layer 2) of the Open Systems Interconnection (OSI) model. For example, the network switch 102 can be an Ethernet switch having 5, 8, 10, 24, or 48 ports (also referred to as network interfaces). The network switch 102 can also be a high throughput switch with more than 50 ports. In some implementations, the network switch 102 can be a router with network layer (layer 3) routing and switching capability, or even a layer 4-7 switch. In some implementations, the network switch 102 can serve a network gateway to an enterprise network or a data center.

The network switch 102 is connected to other network devices, including other network switches 108 and 110 that are further connected to computers 114, 116, 118, 120, 124, 126. The network switch 102 is also connected to the Internet 112 and the packet processor 104. The network switch 102 processes and forwards data received from the network switches 108 and 110, as well as from, for example, the Internet 112. In some other implementations, the network switch is not connected to the Internet 112, but instead is located at a gateway between one local area network and network or at any other location within a network where network function virtualization may be desired. For illustrative purposes, the network switch 102 includes 52 ports numbered 1-52. As shown in FIG. 1, the network switch 102 is connected to the switch 108 through port 1, the switch 110 through port 2, the Internet 112 through port 49, and the packet processor 104 through port 52. In some implementations, the port through which a connection to the packet processor is made is a dedicated control plane port, such as an OpenFlow or OpenFlow compatible port.

The network switch 102 also includes a switch processor 130. The switch processor 130 executes routing, forwarding, and network function externalization functions, as described further below.

When the network switch 102 receives a packet, before routing the packet to the next node along a network path, the switch processor 130 causes the network switch 102 to forward the packet to the packet processor 104 for externalized network function processing.

In brief overview of the network function externalization process, upon receiving a packet for a destination node outside the network, for example, across the Internet 112, from a device within the network, a switch, such as the switch 108 forwards the packet to the network switch 102, which is the next hop along a network path. The network switch 102 receives the packet from the switch 108. The switch processor 130 examines the packet to determine if there are any network functions that need to be carried out on the packet before it is forwarded to its next hop. If such a network function is identified, the packet is tagged with an identifier for a corresponding virtualized network function module on the packet processor 104 and the packet is forwarded to the packet processor 104 via the direct link 106. The packet processor 104 processes the packet based on the identifier, tags the packet with another identifier indicating that the particular network function has been executed on the packet, and then sends the processed packet back to the network switch 102. The network switch 102 receives the processed packet and passes along the processed packet to the next node along a network path.

In some implementations, the packet processor 104 can be a general purpose processor executing computer executable instructions stored on a tangible computer readable medium. For example, the packet processor 104 can be implemented in an architecture similar that shown in FIG. 7. In some implementations, a computer server hosts the packet processor 104. In some implementations, the switch processor 130 can be or can include special purpose circuitry such as an application-specific integrated circuit (ASIC) or a field-programmable gate array (FPGA).

Figure 2:
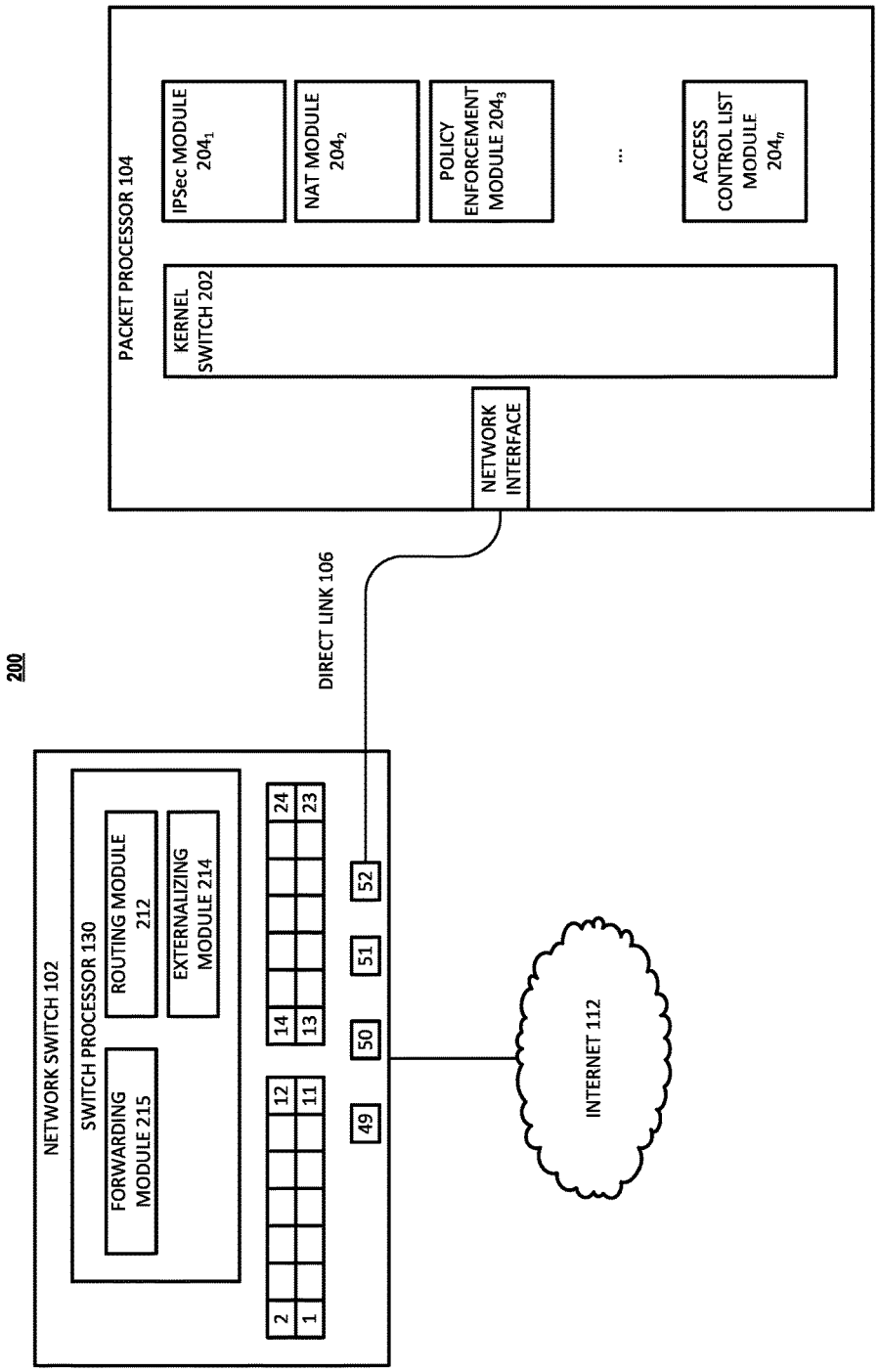
FIG. 2 is a block diagram of the network switch and the packet processor shown in FIG. 1.

FIG. 2 is a block diagram of the network switch 102 and the packet processor 104 shown in FIG. 1. As described above, the network switch 102 has multiple ports through which packets are transmitted. The network switch 102 includes the switch processor 130, which includes a routing module 212, a forwarding module 215, and a function externalization module 214. In some implementations configured for use in software defined networks (SDNs), the switch processor 130 can omit the routing module 214, and instead rely on a similar module included in a central SDN processor to carry out the functionality of the routing module 214 remotely. Such a centralized SDN processor can then configure the network switch, for example, by providing forwarding tables similar to those discussed below, over a control plane or data plane connection.

In some implementations, the routing module 212 generates and maintains a set of routing rules. For example, the routing module generates and maintains a routing information base (RIB). The RIB stores data reflecting the topology of the network (or portions thereof). The routing module 212 is further configured to determine routes to other nodes within the network based on the stored topology information. Based on the determined routes, the routing module 212 can be configured to populate a forwarding table for use by the forwarding module 215. The forwarding table stores information that maps packet destination IP addresses, address ranges, or flow identification data to a next hop node, the node's MAC address, and the port on the network switch 102 via which the next hop node can be reached. In some implementations, the forwarding table can further store a list of network functions to be applied to a packet associated with various flows or destined for various IP addresses prior to the packet being forwarded to the next hop. In other implementations, the list of network functions to be applied to a packet can be associated with other packet information, including, without limitation, routing information or layer 4 packet data. In some other implementations, the list of network functions to be applied can be stored in a data structure distinct from the forwarding table.

The forwarding module 215 is configured to apply the forwarding instructions included in the forwarding table populated by the routing module 212. For example, upon receiving a packet at the network switch 102, the forwarding module 215 can extract the destination IP address (or a data tuple including the values of multiple data fields, such as source and destination IP addresses and port numbers, or other data fields used to identify a flow) and carry out a lookup on the forwarding table. If the forwarding table indicates one or more network functions are to be applied to the packet before forwarding the packet, the forwarding module passes the packet to the function externalization module 214 indicating the functions to be performed. If the packet does not need to be processed by any network functions or if such processing is already completed, the forwarding module 215 updates the destination MAC address of the packet header to match the MAC address of the next hop node and forwards the packet over the port identified in the forwarding table.

The function externalization module 214 implements the logic of forwarding the packet to the packet processor and managing the workflow of externalizing network functions. For example, the function externalization module 214 stores identifier(s) of a port or ports that are dedicated to communicating with packet processor(s). The function externalization module 214 also maintains a function table, listing specific network functions that are handled by the packet processor(s). In some implementations, the network switch 102 has a single port that is dedicated to the packet processor 104. For example, as illustrated in FIG. 2, port 52 is dedicated to the packet processor 104. The dedicated port may be an ordinary data plane port, or it may be a specialized control plane port. Any packet that needs network function processing is routed through port 52 to be forwarded to the packet processor 104. In some other implementations, the network switch 102 is connected to more than one packet processor within multiple network function processing servers. In such implementations, the network switch 102 might have multiple ports, each of which is dedicated to a particular packet processor. In other implementations, multiple network function processing servers can be reached via a single port on the network switch 102. For multiple network function processing servers, in some implementations, each server is dedicated to a subset of network functions. For example, a first server may be dedicated to the network function of encrypting IP packets, whereas another server maybe dedicated to the network function of network address translation. In other implementations, each server handles the same network functions, and packets are forwarded to one or the other server according to one of a number of load balancing techniques known to a person of ordinary skill in the art.

The function externalization module 214 may be further configured to control the order in which externalized network functions are applied to a packet. For example, upon receiving a packet from the forwarding module 215 with a set of network functions to be applied to the packet, the function externalization module 214 is configured to, one function at a time, modify the packet's header to identify the next function to be applied to the packet, forward the packet to the packet processor 104 for processing, and await receipt of the packet back from the packet processor 104. If all processing is complete, the function externalization module returns the packet to the forwarding module 215. If further processing is required, the function externalization module 214 modifies the packet header again and returns the packet to the packet processor 104. In some other implementations, the function externalization module 214 upon receiving a packet, modifies the header to identify multiple functions to be carried out by the packet processor 104 before it returns the packet. For example the packet processor 104 can add a stack of MPLS labels to the packet header. Each MPLS label identifies a different function to be carried out by the packet processor 104. In such implementations, the packet processor 104 returns the packet to the network switch 102 upon completion of all identified processes.

Each network function to be carried out is assigned a unique identifier across all such network functions. Likewise, the output of each network function is assigned a unique identifier across all such network function outputs. As such, the function externalization module 214, when modifying the header of the packet, can add the identification of the function to be carries out to the packet header. When the processing is complete, the packet processor 104 can replace the identifier of the function to be carried out with an identifier indicating that the function has been successfully completed. Based on the identifier mechanism described above, the direct link 106 can carry multiple packets and the packet processor 104 can process multiple network functions.

Identifiers such as those described above can be included in various fields that are already included in a layer 2 or layer 3 packet, including, the MAC address field (e.g., destination MAC address field or source MAC address field), the VLAN tag field, the Generic Routing Encapsulation (GRE) header field, the Multiprotocol Label Switching (MPLS) header field (or in MPLS labels), etc. Packet tagging using various fields is described further in detail in relation to FIGS. 6A-6D. In some implementations, a packet is tagged with more than one identifier, indicating more than one network function is to be carried out or has been carried out. In implementations in which a dedicated control plane port, such as an OpenFlow port is used as the direct physical connection between the network switch 102 and the packet processor 104, the identifiers can be placed in any of the packet header fields referenced above, with the packet encapsulated within a control plane packet, such as an OpenFlow PacketIn or PacketOut message. In some implementations, for packets forwarded to the packet processor 104, the identifiers may instead or additionally be included along with the encapsulation, such as in the "cookie" field included in the OpenFlow PacketIn message.

In some implementations, network functions are unidirectional. That is, the function only need be carried out when a packet enters the network from a foreign network (such as the Internet) but not when a packet leaves the network, or vice versa. An example of such a network function is an access control list (ACL) function. The ACL function filters out packets by comparing information in the packet to an access control list (such as a black list of source IP addresses, or header tuples) to enforce security policies, e.g., to filter out packets known to come from spoofed IP addresses or having known signatures associated with packets associated malicious behavior. In some other implementations, the ACL function can also be applied to packets exiting the network, for example, to prevent unauthorized leakage of sensitive information by blocking packets originating from IP addresses of certain identified devices.

In other implementations, network functions come in pairs. For example, network address transition (NAT) has two functions NAT and DE-NAT. NAT translates private source identifier information (such as internal source IP addresses and/or port numbers) in a packet originating from within a network to public source identifier information (such as external source IP address and/or port information) to transmit the packet over an external network. DE-NAT does the opposite. DE-NAT translates destination information in packets received from outside of a network into the corresponding private destination information for the destination used within the network. To accommodate this duality of the network function, in some implementations, a bidirectional network function may be associated with four identifiers: a LOCAL_To Be_Processed identifier, a REMOTE_To_Be_Processed identifier, a LOCAL_Processed identifier, and a REMOTE_Processed identifier.

In some implementations, each function is only associated with a single identifier, and LOCAL vs. REMOTE and To_Be_Processed and Processed distinctions are denoted in respective single bit flags added to the packet header in specified data fields or appended to the end of the function identifier. As such, if the packet processor 104 can carry, for example eight different functions, the function along with their corresponding LOCAL vs. REMOTE and To_Be_Processed and Processed flags can be captured in only five bits. In some other implementations, the status of the packet as being To_Be_Processed or _Processed may be inferred from the direction the packet flowed. For example a packet received from the network processor 104 is assumed to have been processed, and a packet received from the network switch 102 is assumed to need processing, eliminating the need for the second flag. In such implementations, in the above example of a packet processor capable of handling eight network functions, the function to be applied to a packet and the packets status can be captured in only four bits. Fewer bits can be used if the packet processor 104 carries out fewer functions and more bits can be used if more functions are implemented.

The LOCAL and REMOTE labels can identify the specific version of the function to be carried out by indicating the either the source or destination of the packet. For example, in some implementations, the LOCAL label can indicate a packet was originated within the network. Thus, with respect to the NAT function, a label of LOCAL indicates that the NAT function to be carried out is NAT. In contrast, the REMOTE label indicates a packet originated outside the network. Accordingly, with respect to the NAT function, the REMOTE label indicates the function to be carried out is DE-NAT.

Still referring to FIG. 2, the packet processor 104 includes a kernel switch 202 and various network function processing modules $204_1$-$204n$ (generally "function modules 204"). The kernel switch 202 is a switching process executing within the kernel of the operating system of the packet processor 104. In some implementations, the function modules 204 are each implemented as separate virtual machines, and the kernel switch 202 is implemented in a hypervisor also running on the packet processor 104.

When the packet processor 104 receives a packet from the network switch 102, the packet is stored in a buffer in memory of the packet processor 104. The kernel switch 202 processes each packet in the buffer in turn. In processing a packet, the kernel switch 202 analyzes the packet header to identify the identifier added to the packet. In some implementations, the kernel switch maintains or has access to a look up table that associates identifiers with their corresponding function modules 204. If the packet includes a To_Be_Processed identifier (or if a To_Be_Processed flag is set), the kernel switch 202 stores the packet in a buffer associated with the appropriate function module 204. In a virtual machine implementation, the packet is passed to the corresponding virtual machine. If the packet includes a Processed identifier (or the To_Be_Processed flag is not set), the kernel switch 202 causes the packet processor 104 to forward the packet back over the direct link 106 to the network switch 102. In some implementations, the LOCAL and REMOTE versions of each network function (where applicable) are carried out by the same function module 204 (or virtual machine). In such cases, all packets to be processed by either version of the network function are stored in the same buffer (or are passed to the same virtual machine). In some implementations, the LOCAL and REMOTE versions of each network function (if applicable) are implemented as separate function modules 204 (or virtual machines) with separate associated buffers (and memory spaces). The buffers can be implemented as dedicated memory locations within cache or other system memory of the packet processor.

The network function processing modules 204 are designated to process specific network functions. Depending on the processing power of the packet processor and the number of network functions implemented, the packet processor 104 may execute one or multiple instances of each network function module 204. If executing within a common environment, instances of the same network function can share a common buffer space. In some other implementations, each instance of a network function is executed in its own virtual machine environment. Examples of suitable network functions to be implemented on the packet processor 104 include, without limitation, IP packet encryption (IPSec), NAT, policy enforcement, ACL or other firewall or network security functionality (such as denial of service attack or intrusion detection). Each of the function modules 204 can be implemented as computer executable instructions stored on a tangible computer readable medium, and which are executed by a multiprocessor included within the packet processor 104.

In some implementations, a packet is marked with multiple identifiers corresponding to multiple network functions. The kernel switch 202 manages the workflow to ensure that the multiple network functions are carried out. The multiple identifiers can be concatenated or stored as separate labels and the kernel switch 202 parses and separates multiple identifiers. For example, in a packet where the function externalization identifiers are stored in MPLS labels, the entire packet, with all of its labels are forwarded in sequence to each indicated function module 204. When the function module completes its corresponding function on the packet, it replaces the To_Be_Processed identifier in the corresponding MPLS label to a Processed identifier. When all MPLS labels include Processed identifiers, the kernel switch 202 causes the packet processor 104 to return the packet with the modified labels back to the network switch 102. In other implementations, as discussed above, the externalization module 214 of the network switch 104 coordinates the execution of multiple network functions, when needed, and forwards a packet needing multiple network functions applied to the packet processor multiple times, once for each function to be carried out, and each time with a different identifier. When the packet is returned to the network switch 102 after the last function is completed, the externalization module 214 returns the packet to the forwarding module 215 for further handling.

Figure 3:
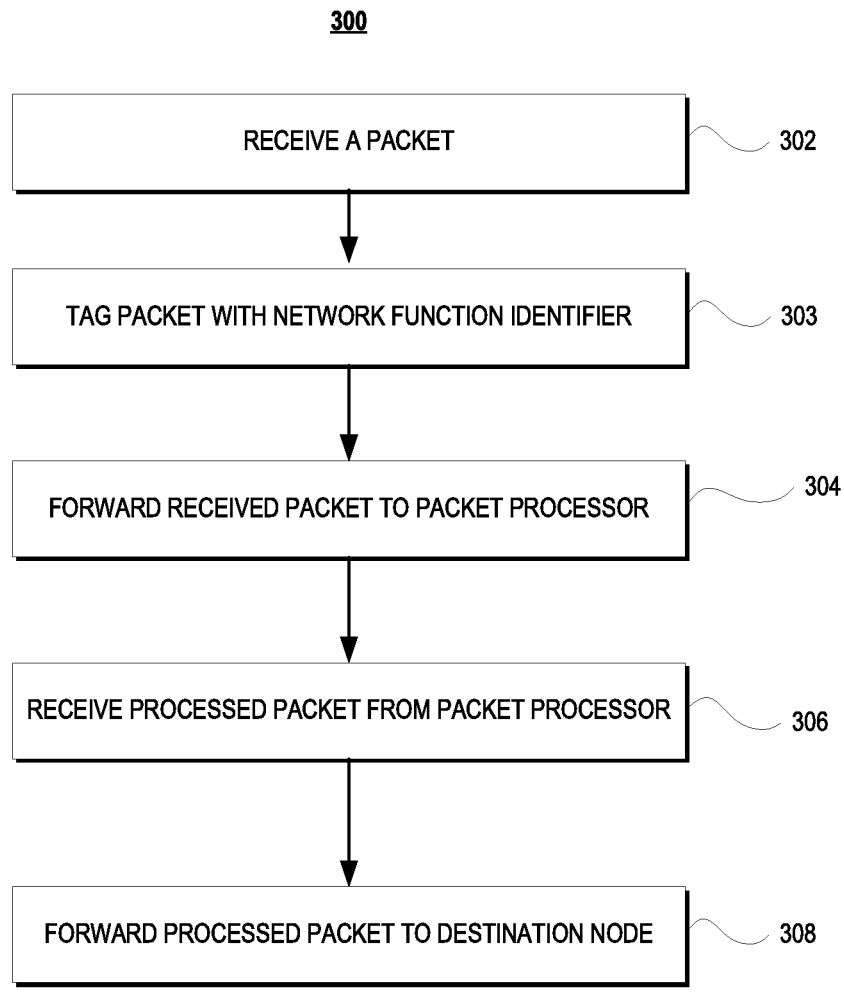
FIG. 3 is a flow chart of an example method for externalizing network functions using the system illustrated in FIG. 1.

FIG. 3 is a flow chart of an example method 300 for externalizing network functions using the system illustrated in FIG. 1. The method 300 include receiving a packet (step 302), tagging the packet with a network function to be carried out on the packet (step 303), forwarding the received packet to the packet processor (step 304), receiving the processed packet from the packet processor (step 306), and forwarding the processed packet to the destination node (step 308).

The method 300 includes receiving a packet (step 302). As described above, a network switch receives packets from other network devices on its local network, the Internet, or other networks. For example, the network switch 102 receives packets from the network switches 108 and 110, as well as from the Internet 112.

The packet is tagged with an identifier of a network function to be carried out on the packet (step 303). For example, with the network switch 102, upon a packet reaching the forwarding module 215, the forwarding module carries out a lookup against its forwarding table based on data in the packets header to identify a next hop node and any network functions to be carried out. If network functions are to be carried out, the packet is passed to the function externalization module 214, which tags the packet as described above with an identifier of one or more network functions. As there is a direct link 106 connecting the network switch 102 and the packet processor 104, the packet can be forwarded to the packet processor 104 without further routing or modification of the layer 2 information already in the packet header. The function externalization module 214 can, in various implementations, include the identifier of a desired function to be carried out on the packet in one of several different layer 2 data fields without interfering with the packet processor 104 receiving the packet or carrying out the designated network function. For example, the network function identifier can be included in, without limitation, the Source MAC Address field, the Destination MAC Address field, the VLAN tag field, the GRE header field, the MPLS header field or added MPLS labels. Tagging using various fields is described in relation to FIGS. 6A-6D.

The network switch forwards the received packet to the packet processor (for example the packet processor 104) (step 304) over a direct link. The direct link can be an electrical or fiber optic cable coupled to a dedicated data plane or control plane port of the network switch and a network interface of the packet processor. In some implementations, after forwarding the received packet to the packet processor, the function externalization module 214 proceeds with processing a next packet in its queue. That is, the network switch 102 need not await the results of processing by packet processor 104 before beginning the processing of another packet.

The network switch receives the processed packet from the packet processor (step 306). As described above, after processing by an appropriate function module (for example a function module 204) executing on the packet processor, the processed packet is tagged with an identifier that identifies the network function that has been carried out and sent back to the network switch over the dedicated link. In some implementations, the network function processing results in packet being dropped, for example due to a negative finding by an ACL or other firewall network function. In such situations, the packet processor can transmit an indication of such event to the network switch so that the network switch can cease waiting for return of the packet.

The network switch then forwards the processed packet to the destination node (step 308). After network function processing is completed, the packet is returned to the forwarding module 215, which completes the forwarding process. For example, the packet's destination MAC address can be populated with the MAC address of the next hop node on the path towards the packet's ultimate destination. The packet can then be passed to the queue of the port connected to the next hop node for transmission.

Figure 4:
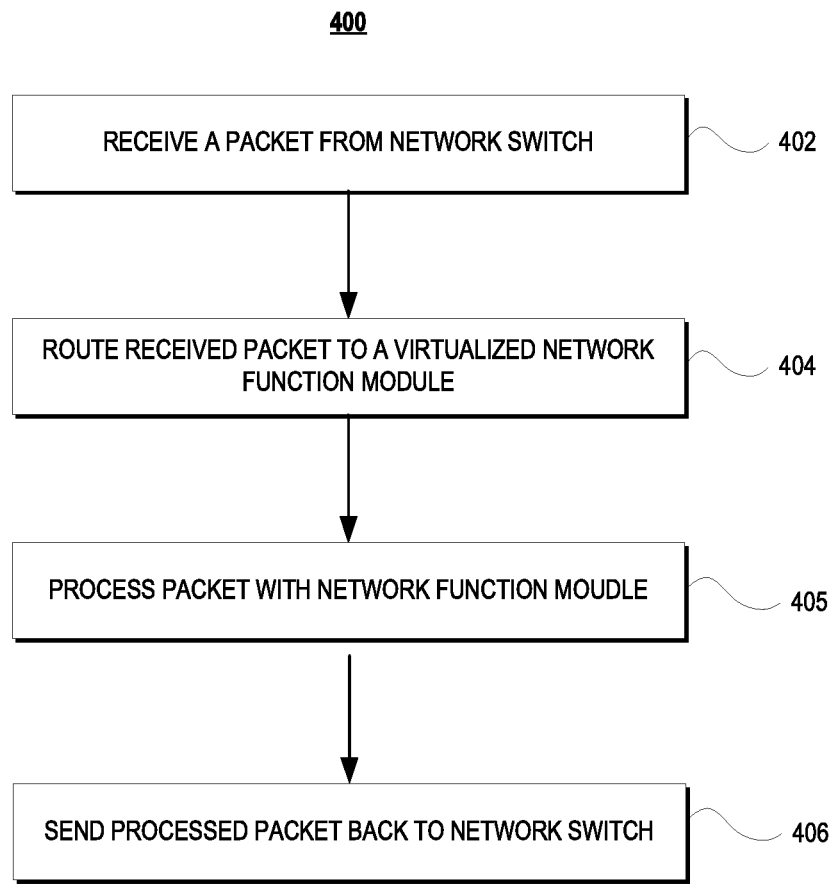
FIG. 4 is a flow chart for an example method for externalizing network functions using the system illustrated in FIG. 1.

FIG. 4 is a flow chart for an example method 400 for externalizing network functions using the system illustrated in FIG. 1.

The method 400 include receiving a packet from a network switch (step 402), routing the received packet to a virtualized network function module to be processed by the module (step 404), processing the packet with the specified network function module (step 405), and sending the processed packet back to the network switch (step 406).

The method 400 includes receiving, by a packet processor (such as the packet processor 104), a packet from a network switch (such as the network switch 102) (step 402). The packet is received over a direct physical link (such as the physical link 106) with the network switch. In some implementations, the received packet is tagged with an identifier that identifies the network function to be carried out on the packet processor. The destination MAC address of the packet is different from the MAC address of the packet processor. The destination MAC address may be different for at least two different reasons. In some implementations, the destination MAC address is different than the MAC address of the packet processor because a function externalization module (such as the function externalization module 214) of the network switch stores an identifier of the function to be carried out in the destination MAC address of the packet. In some other implementations, the function identifier is stored in a different header field, but, because the packet has not yet undergone layer 2 routing at the network switch when the packet is forwarded to the packet processor, the destination MAC address still holds the MAC address of the network switch 102. To allow the packet processor to receive and process the packet even though the destination MAC address of the packet does not match its own MAC address, the packet processor or its network interface to which the can be programmed or otherwise configured, in various implementations, to accept packets with any destination MAC address, packets with the destination MAC address of the network switch, or packets whose destination MAC address includes one or more of the function identifiers associated with the network functions executing on the packet processor.

The packet processor routes the received packet to a network function module (such as one of the function modules 204) (step 404). For example, based on the function identifier in the packet header, the packet processor (for example via a kernel switch 202), passes the received packet to a virtual machine executing a network function module designated to process the network function identified by the identifier.

The packet processor then processes the packet with the specified network function module (step 405). As indicated above, the network function module may execute, without limitation, ACL or other firewall processing, IPsec (encryption or decryption), policy enforcement, and NAT (NAT or DE-NAT). Upon completion of the processing, the packet header is updated to include an identifier indicating as such.

The packet processor sends the processed packet back to the network switch (step 406). As described above, for example, after the designated network function module processes the network function, the packet is updated with the network function carried out and an identifier indicating that the corresponding network function has been carried out. Upon processing by, e.g., a kernel switch, such as the kernel switch 202, the packet processor 104 sends the processed packet back to the network switch 102.

In some implementations, for a given set of packets received by the packet processor (at step 402), the packet processor may not return an equal number of packets back to network switch. For example, packets may be sent back to the network switch in duplicate form with different destination addresses such that the packet is transmitted to multiple destination nodes. In other cases, the data of received packets may be split across multiple smaller or combined into a fewer number of packets to accommodate varying buffer sizes of various sending and receiving devices. Similarly, encryption of data can often lead to an increase in the number of bits used to represent the data, which may lead to the need to fragment the encrypted data in to multiple packets to accommodate packet size limits. Data resulting from the decryption of certain packets may enable the decrypted data to be forwarded with fewer packets was used to transmit the data while encrypted. In some implementations, the packet processor, in applying a network function to a packet, may generate wholly new packets for the network switch to send. For example, the DE-NAT function may initiate an ARP request to a connected host to obtain appropriate destination data to insert into a packet being processed.

To illustrate the above methods 300 and 400 shown in FIGS. 3 and 4, FIGS. 5A-5D show the state of a packet header as it is processed according to one example implementation of the methods 300 and 400 by the network switch 102 and packet processor 104 shown in FIGS. 1 and 2.

Figure 5A:
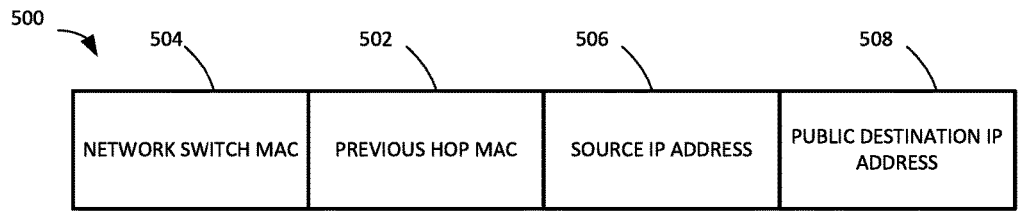
FIGS. 5A-5D show the state of a packet header as it is processed according to one example implementation of the methods shown in FIGS. 3 and 4 by the network switch and packet processor shown in FIGS. 1 and 2.

FIG. 5A shows the header 500 of a packet, as it is received by the network switch 102 (at step 302), destined to a computer that is in the same administrative network of the network switch 102, for example the computer 114. The packet 500 has, among other header fields, a source MAC address 502 field, a destination MAC address field 504, a source IP address field 506 and destination IP address field 508. Upon initial receipt at the network switch 102, the destination MAC address field 504 holds the MAC address of the network switch 102. The source MAC address field 502 holds the MAC address of the previous hop along a network path (i.e., the hop before the network switch). The source IP address field 506 includes the source IP address of the sender. The destination IP address field 508 holds a public IP address associated with the end recipient of the packet, for example computer 114.

Figure 5B:
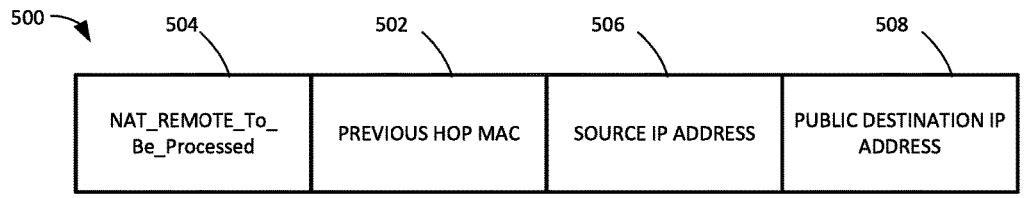

FIG. 5B shows the state of the packet header 500 after processing by the function externalization module 214 (at step 303) indicating that the packet is to be processed by the DE_NAT function to convert the public destination IP address of computer 114 included in the destination IP address field 508 from a public IP address to the private, internal IP address of computer 114. As the packet processor 104 and network switch 102 are connected by a the direct link 106, the network switch 102 can forward the packet directly to the packet processor 104 without including the MAC address of the packet processor 104 in the destination MAC Address field. Accordingly, the DE_NAT function identifier is included in the destination MAC address field 504 of the packet header 500. More particularly, the DE_NAT function is indicated by the label NAT_REMOTE_To_Be_Processed. As indicated above, DE_NAT is the NAT function carried out on remotely generated packets, whereas NAT is the NAT function carried out on LOCAL packets, i.e., those generated within the network.

After including the identifier NAT_REMOTE_To_Be_Processed in destination MAC address field 504, the network switch 102 forwards the packet to the packet processor 104 over the direct link 106 (at step 304). The packet processor 104 receives the packet with the header 500 as shown in FIG. 5B (at step 402).

Figure 5C:
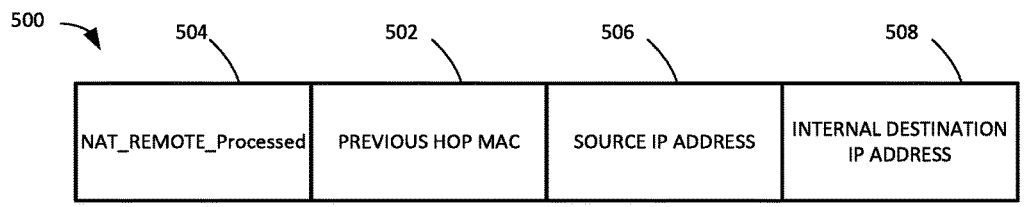

FIG. 5C shows the packet header 500 after it has been processed by a function module 204 executing on the packet processor (at step 405) as it is returned to the network switch (at step 406). As shown in FIG. 5C, as part of the processing by DE-NAT function at the packet processor 104, the destination IP address field 508 was updated to include the internal private IP address of the end recipient computer, computer 114. In order for the network switch 102 to recognize the packet as already having been processed, the packet processor 104 replaced the function identifier in the destination MAC address field 504 with NAT_REMOTE_Processed.

Figure 5D:
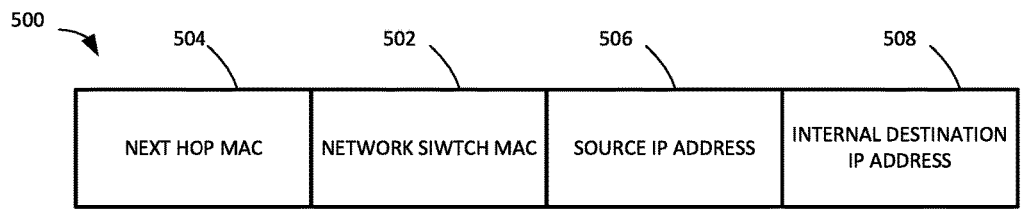

FIG. 5D, shows the packet header 500 as it forwarded (at step 308) by the network switch towards its destination node. As shown in FIG. 5D, relative to FIG. 5C, the destination MAC address field 504 has been updated to indicate the MAC address of the next hop node on the path to destination node, computer 114.

As indicated above, the above example, which relies upon modifying a destination MAC address of a packet to indicate which network functions are to be carried or have been carried out on a packet, is only one example implementation of the methods 300 and 400. In other implementations, the function identifiers can instead be included in other header fields.

FIGS. 6A-6D illustrate various fields associated with a packet, such as the MAC address field(s), the VLAN tag field, the Generic Routing Encapsulation header field, and the Multiprotocol Label Switching header field, in which an identifier for a virtualized network function executing on the packet processor can be included.

Figure 6A:
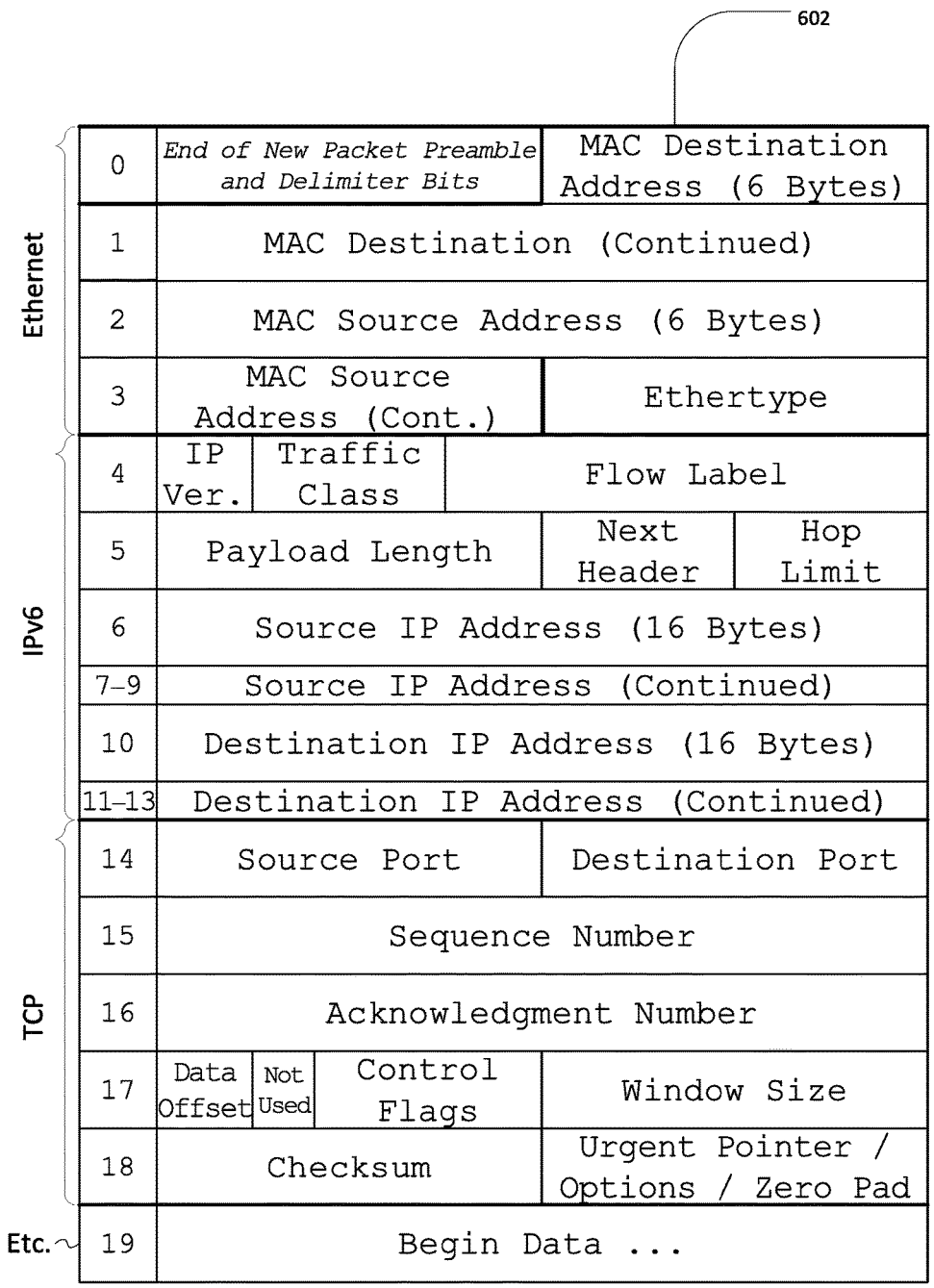
FIGS. 6A-6D show locations of various packet header fields in which an identifier for a virtualized network function executing on the packet processor can be included.

FIG. 6A shows a typical packet header for an IPv6 packet. A typical packet includes layer 2 data link layer (e.g., Ethernet) header fields, layer 3 network layer (e.g., IPv4 or IPv6) header fields, and layer 4 transport layer (e.g., TCP) header fields. FIG. 6A highlights the location of the destination MAC address field 602 in a typical IPv6 packet.

Figure 6B:
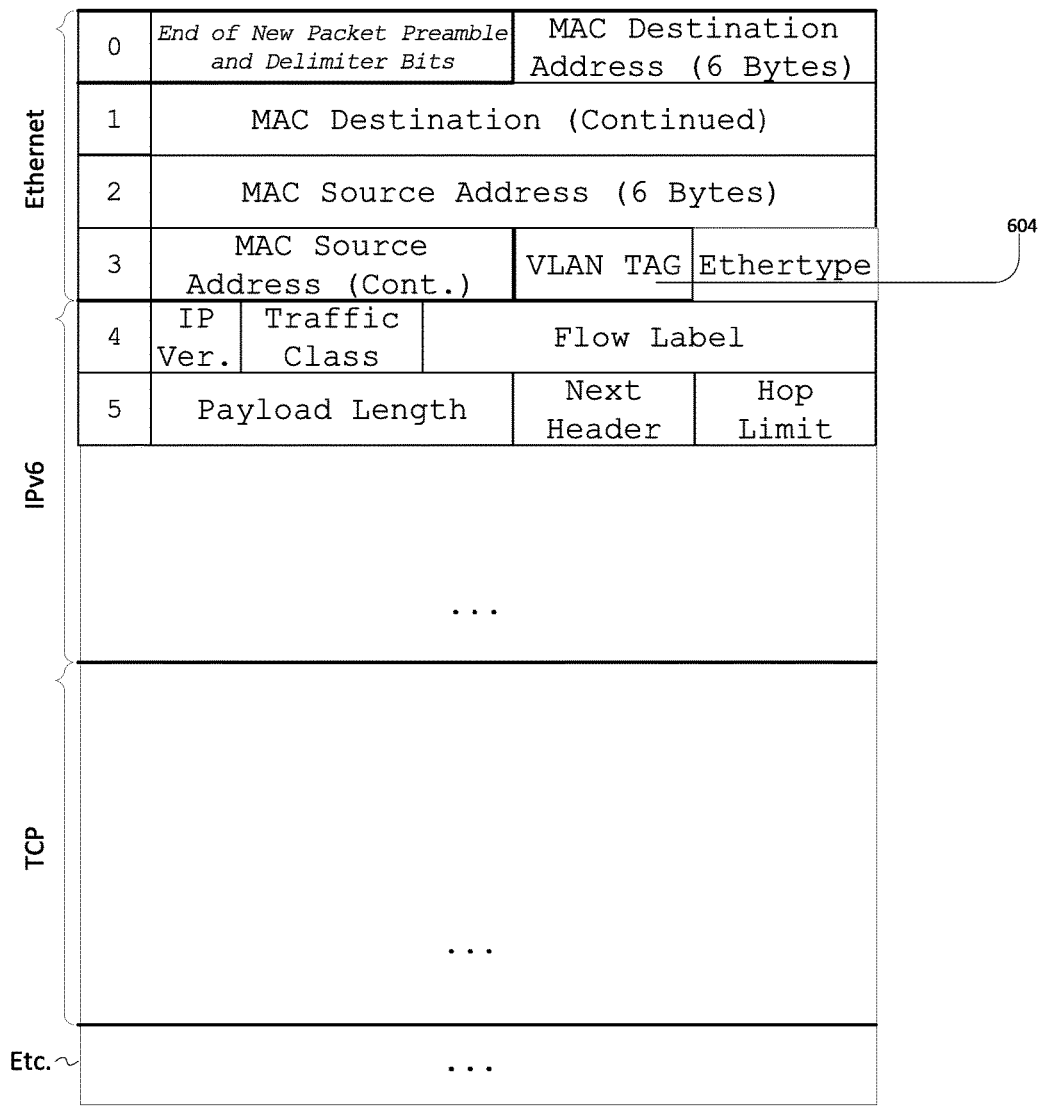
Figure 6C:
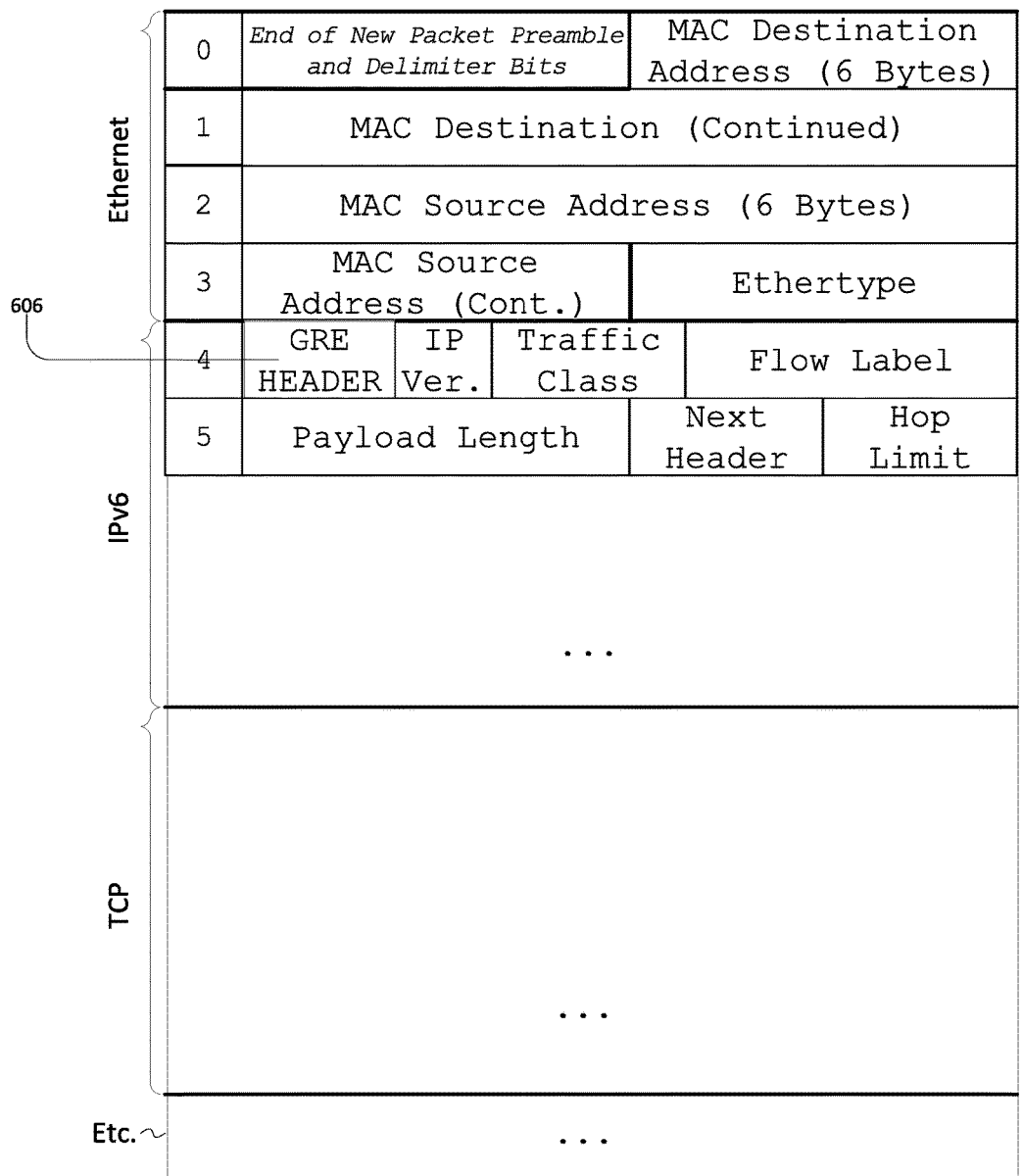

As mentioned above, in some implementations, the aforementioned network function identifiers can be included in the VLAN tag field 604 (e.g., defined by IEEE 802.1Q). FIG. 6B shows the location of the VLAN tag field 604 in an IPv6 packet header, included in a first portion of the Ethertype field In some other implementations, the network function identifier can be included in a Generic Routing Encapsulation (GRE) header field 606 (e.g., defined by RFC 2784). The location of the GRE field 606 is shown in FIG. 6C. The GRE header field 606 is inserted between the Ethertype field and the IP Version field in the header.

Figure 6D:
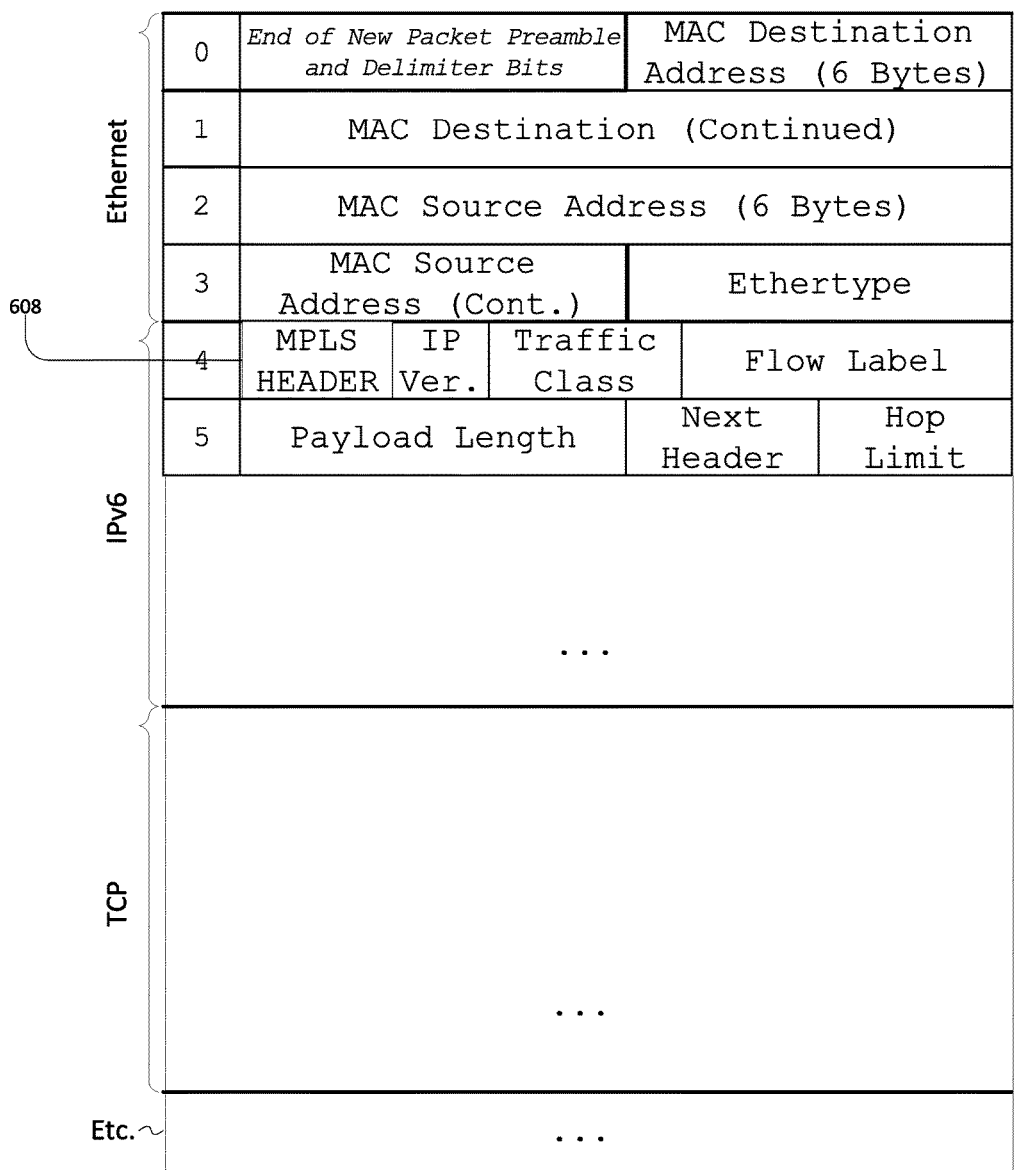

In still some other implementations, the network function identifiers can be included in an MPLS header field 608 (e.g., defined by RFC 3031). FIG. 6D shows the location of the MPLS header field 608 in an IPv6 packet. The MPLS header field 608 is included in a similar location as the GRE header field 606. In some implementations, the MPLS header field 608 contains one or more labels (i.e., a label stack). One or more network function identifiers can be included in respective MPLS labels within the MPLS header field 608.

Figure 7:
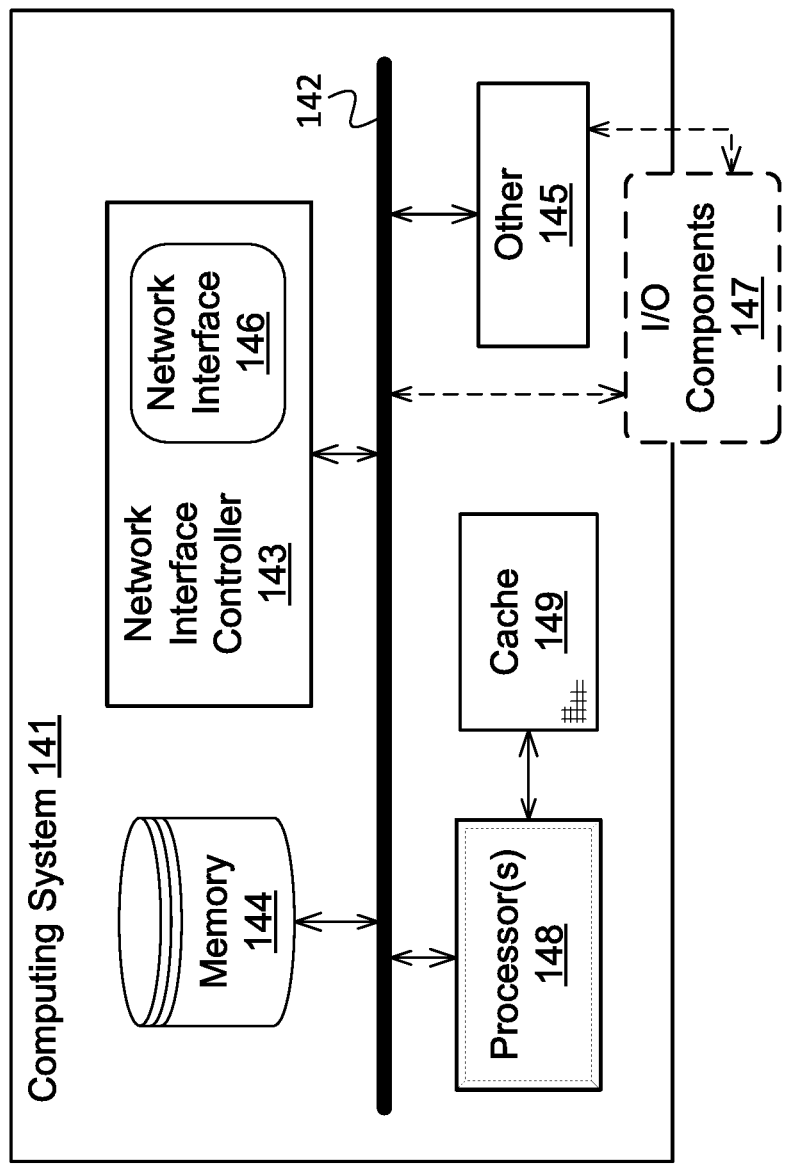
FIG. 7 is a block diagram for a computing system suitable for use in the various implementations described.

FIG. 7 is a block diagram of an example computing system 141 suitable for use for the network switch and the packet processor. For example, the computer system 141 is suitable for use in implementing the packet processor 104. In broad overview, the computing system 141 includes at least one processor 148 for performing actions in accordance with instructions and one or more memory devices 144 or 149 for storing instructions and data. The illustrated example computing system 141 includes one or more processors 148 in communication, via a bus 142, with memory 144, at least one network interface controller 143 with network interface port 146 for connection to a network (not shown), and other components 145, e.g., input/output ("I/O") components 147. Generally, the processor(s) 148 will execute instructions received from memory. The processor(s) 148 illustrated incorporate, or are directly connected to, cache memory 149. In some instances, instructions are read from memory 144 into cache memory 149 and executed by the processor(s) 148 from cache memory 149.

In more detail, the processor(s) 148 may be any logic circuitry that processes instructions, e.g., instructions fetched from the memory 144 or cache 149. In many embodiments, the processor(s) 148 are microprocessor units or special purpose processors. The computing device 141 may be based on any processor, or set of processors, capable of operating as described herein. The processor(s) 148 may be single core or multi-core processor(s). The processor(s) 148 may be multiple distinct processors. In some implementations, the processor(s) 148 are implemented as circuitry on one or more "chips."

The memory 144 may be any device suitable for storing computer readable data. The memory 144 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto-optical disks, and optical discs (e.g., CD ROM, DVD-ROM, or Blu-Ray® discs). A computing system 141 may have any number of memory devices 144.

The cache memory 149 is generally a form of computer memory placed in close proximity to the processor(s) 148 for fast access times. In some implementations, the cache memory 149 is part of, or on the same chip as, the processor (s) 148. In some implementations, there are multiple levels of cache 149, e.g., L2 and L3 cache layers.

The network interface controller 143 manages data exchanges via the network interface 146 (sometimes referred to as a network interface port). The network interface controller 143 handles the physical and data link layers of the OSI model for network communication. In some implementations, some of the network interface controller's tasks are handled by one or more of the processor(s) 148. In some implementations, the network interface controller 143 is incorporated into the processor 148, e.g., as circuitry on the same chip. In some implementations, a computing system 141 has multiple network interfaces 146 controlled by a single controller 143. In some implementations, a computing system 141 has multiple network interface controllers 143. In some implementations, each network interface 146 is a connection point for a physical network link (e.g., a cat-5 Ethernet link). In some implementations, the network interface controller 143 supports wireless network connections and an interface port 146 is a wireless (e.g., radio) receiver/transmitter (e.g., for any of the IEEE 802.11 protocols, near field communication "NFC", Bluetooth, BLE, ANT, or any other wireless protocol). In some implementations, the network interface controller 143 implements one or more network protocols such as Ethernet. Generally, a computing device 141 exchanges data with other computing devices via physical or wireless links through a network interface 146. The network interface 146 may link directly to another device or to another device via an intermediary device, e.g., a network device such as a hub, a bridge, a switch, or a router, connecting the computing device 141 to a data network such as the Internet.

The computing system 141 may include, or provide interfaces for, one or more input or output ("I/O") components 147. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

The other components 145 may include an I/O interface, external serial device ports, and any additional co-processors. For example, a computing system 141 may include an interface (e.g., a universal serial bus ("USB") interface) for connecting input devices, output devices, or additional memory devices (e.g., portable flash drive or external media drive). In some implementations, a computing device 141 includes an additional device 145 such as a co-processor. For example, a math co-processor can assist the processor 148 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A network system for externalizing network functions, comprising:
   a network switch configured to:
      receive a packet via a first network interface, wherein the packet is directed to a destination node other than the network switch;
      forward the received packet to a packet processor for processing, via a second network interface, over a direct physical link between the network switch and the packet processor, wherein:
         the network switch forwards the packet along with an identifier for a virtualized network function executing on the packet processor, and
         a destination MAC address of the packet is different from a MAC address of the packet processor;
      receive from the packet processor the processed packet; and
      forward the processed packet over a third network interface towards the destination node; and
   the packet processor, comprising a general purpose computer processor, configured to:
      execute a plurality of different virtualized network function modules, including at least two of a network address translation module, a policy enforcement module, an encryption module, an access control list filtering module, a firewalling module, and an intrusion detection module;
      receive the packet from the network switch;
      route the received packet within the packet processor to one of the plurality of virtualized network function modules executing on the packet processor based on the identifier included with the packet for processing; and
      send the processed packet back to the network switch.

2. The system of claim 1, wherein the packet processor is configured to recognize at least two identifiers associated with at least one of the virtualized network functions, including a first identifier for identifying a version of the virtualized network function to be executed on locally generated packets and a second identifier for a version of the network function to be executed on remotely generated packets.

3. The system of claim 1, wherein the processed packet includes an identifier that identifies a network function that has been carried out in processing the packet.

4. The system of claim 1, wherein the identifier for the virtualized network function is included in one of a MAC address field, VLAN tag field, Generic Routing Encapsulation header field, or Multiprotocol Label Switching header field associated with the packet.

5. The system of claim 1, wherein the network switch is configured to forward the processed packet back to the packet processor along with a second identifier for a second virtualized network function executing on the packet processor.

6. The system of claim 1, wherein the identifier is a first identifier, and the network switch is configured to forward the received packet to the packet processor along with the first identifier and a second identifier for a second virtualized network function executing on the packet processor.

7. The system of claim 1, comprising a central software-defined network (SDN) processor configured to provide the network switch with a forwarding table use in forwarding the processed packet.

8. The system of claim 1, comprising a second packet processor comprising a second general purpose computer processor configured to execute a second plurality of different virtualized network function modules.

9. A network switch comprising:
   a processor;
   non-transitory computer readable media storing computer executable instructions, which when executed by the processor cause the processor to:
      receive a packet via a first network interface, wherein the packet is directed to a destination node other than the network switch;
      modify a field within the header of the packet to include an identifier for a virtualized network function executing on the packet processor;
      forward the received packet with the modified header to a packet processor comprising a general purpose computer processor, via a second network interface, over a direct physical link between the network switch and the packet processor, wherein:
         the network switch forwards the packet with a destination MAC address that is different from a MAC address of the packet processor, the packet processor executes a plurality of different virtualized network function modules, including at least two of a network address translation module, a policy enforcement module, an encryption module, an access control list filtering module, a firewalling module, and an intrusion detection module, the identifier corresponds to one of the plurality of virtualized network function modules, and the packet processor uses the identifier to route the packet within the packet processor to the corresponding virtualized network function module;

receive from the packet processor the packet after it has been processed by the identified virtualized network function; and forward the processed packet over a third network interface towards the destination node.

10. The network switch of claim 9, wherein the packet processor is configured to recognize at least two identifiers associated with at least one of the virtualized network functions, including a first identifier for identifying a version of the virtualized network function to be executed on locally generated packet and a second identifier for a version of the network function to be executed on remotely generated packets.

11. The network switch of claim 9, wherein the processed packet includes an identifier that identifies a network function that has been carried out in processing the packet.

12. The network switch of claim 9, wherein the identifier for the virtualized network function is included in one of a MAC address field, VLAN tag field, Generic Routing Encapsulation header field, or Multiprotocol Label Switching header field associated with the packet.

13. The network switch of claim 9, wherein the instruction further cause the processor to forward the processed packet back to the packet processor along with a second identifier for a second virtualized network function executing on the packet processor.

14. The network switch of claim 9, wherein the identifier is a first identifier, and the instruction further cause the processor to forward the received packet to the packet processor along with the first identifier and a second identifier for a second virtualized network function executing on the packet processor.

15. A packet processor, comprising:
a general purpose computer processor;
non-transitory computer readable media storing computer executable instructions, which when executed by the processor cause the processor to:
execute a plurality of different virtualized network function modules, including at least two of a network address translation module, a policy enforcement module, an encryption module, an access control list filtering module, a firewalling module, and an intrusion detection module;

receive a packet from a network switch, over a direct physical link between the network switch and the packet processor, wherein:
the received packet includes an identifier corresponding to one of the virtualized network function modules executing on the packet processor to be carried out on the packet, and
a destination MAC address of the received packet is different from a MAC address of the packet processor;

route the received packet within the packet processor to the network function module corresponding to the identifier;

process the packet using the corresponding network function module; and send the processed packet back to the network switch over the direct physical link.

16. The packet processor of claim 15, wherein the packet processor is configured to recognize at least two identifiers associated with at least one virtualized network function, including a first identifier for identifying a version of the virtualized network function to be executed on locally generated packets and a second identifier for a version of the network function to be executed on remotely generated packets.

17. The packet processor of claim 15, wherein the computer executable instructions, when executed by the processor, cause the processor to, after the packet has been processed by the network function module, modify the packet header to include an identifier that indicates that the identified network function has been carried out on the packet.

18. The packet processor of claim 15, wherein the identifier for the virtualized network function is included in one of a MAC address field, VLAN tag field, Generic Routing Encapsulation header field, or Multiprotocol Label Switching header field associated with the packet.

19. The packet processor of claim 15, wherein the instruction further cause the processor to receive the processed packet back from the network switch along with a second identifier for a second virtualized network function executing on the packet processor.

20. The packet processor of claim 15, wherein the identifier is a first identifier, and the instruction further cause the processor to forward the received packet to the packet processor along with the first identifier and a second identifier for a second virtualized network function executing on the packet processor.

* * * * *